April 30, 1929.  W. HOLMES  1,711,387
ROAD SCRAPER
Filed Aug. 18, 1926   3 Sheets-Sheet 1

Inventor
William Holmes
By C. A. Snow & Co.
Attorneys

April 30, 1929.  W. HOLMES  1,711,387
ROAD SCRAPER
Filed Aug. 18, 1926  3 Sheets-Sheet 2

William Holmes Inventor
By C A Snow & Co.
Attorneys

April 30, 1929.  W. HOLMES  1,711,387
ROAD SCRAPER
Filed Aug. 18, 1926  3 Sheets-Sheet 3
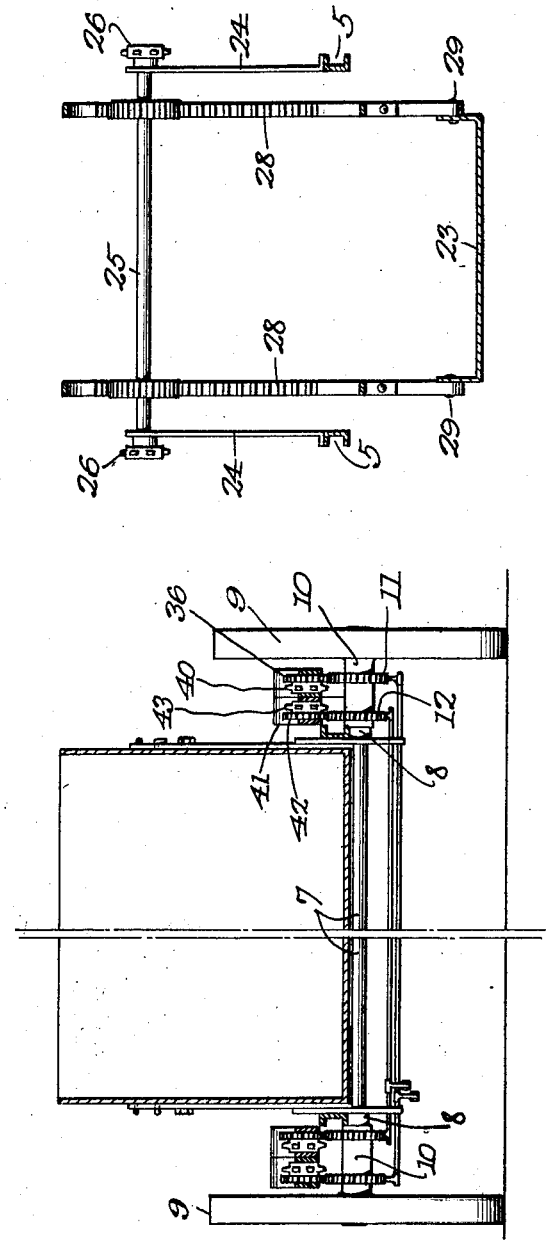
William Holmes
Inventor Patented Apr. 30, 1929.

1,711,387

UNITED STATES PATENT OFFICE.

WILLIAM HOLMES, OF PARKERSBURG, WEST VIRGINIA.

ROAD SCRAPER.

Application filed August 18, 1926. Serial No. 130,000.

The present invention relates to road machines, and more particularly machines for scraping or grading road surfaces.

The primary object of the invention is to provide a one-man control machine, novel means being provided adjacent to the operator's seat, for operating the various elements of the machine.

Another object of the invention is to provide a machine of this character which will convey the larger stones and particles of dirt, to the rear of the machine where they may be carried in a dump body mounted at the rear of the machine, which dump body may be dumped at any predetermined place.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is a sectional view taken on line 3—3 of Figure 1.

Figure 4 is a sectional view taken on line 4—4 of Figure 1.

Figure 1:
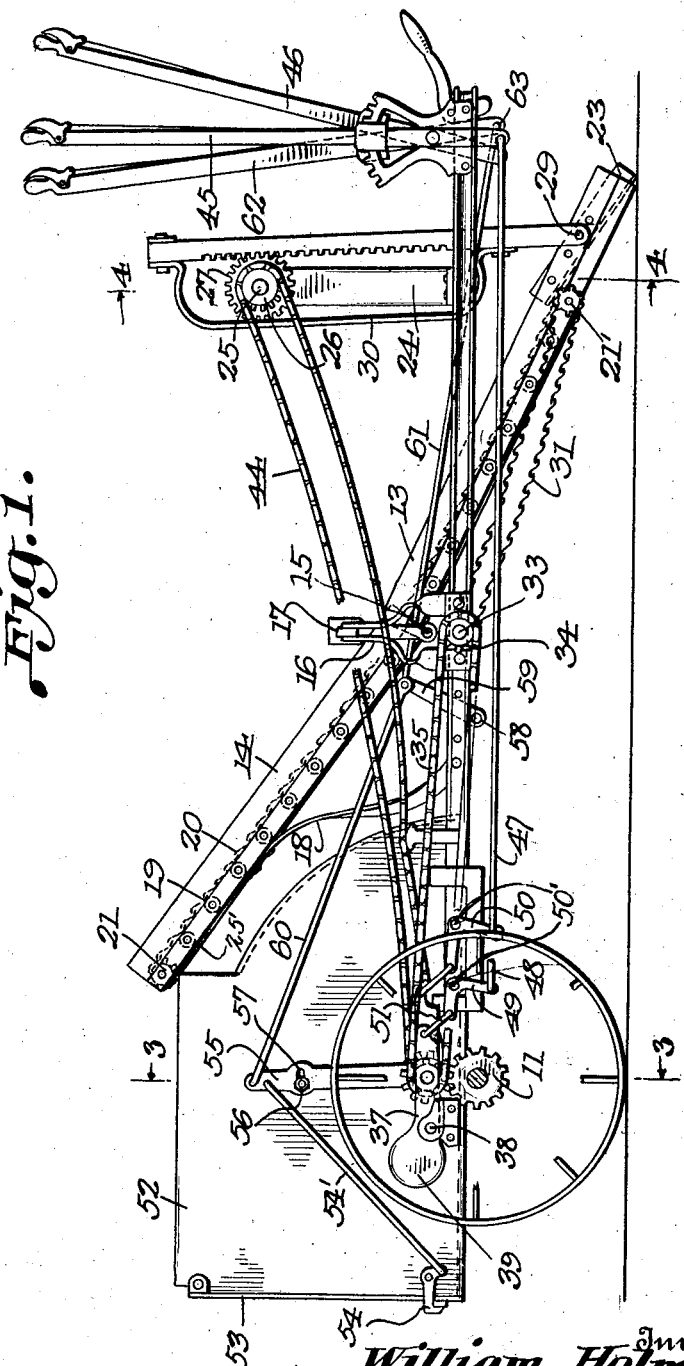
Figure 1 is a side elevational view of a road machine constructed in accordance with the invention.
Figure 2:
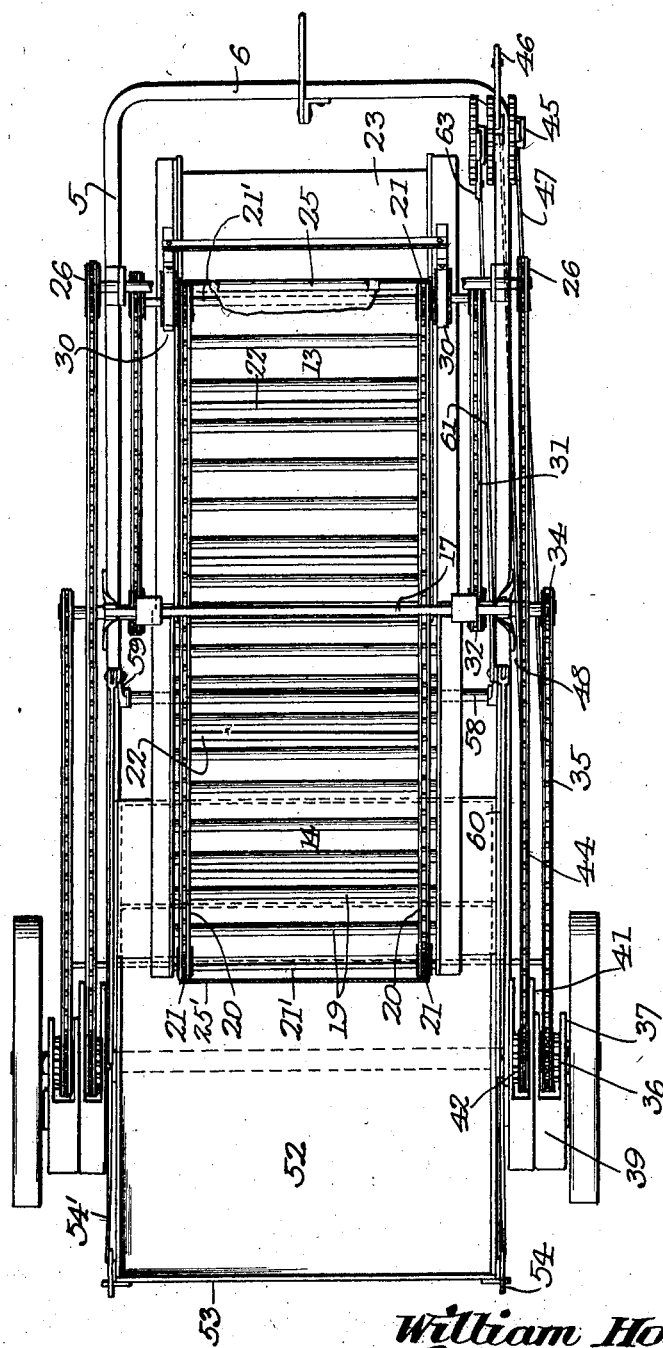
Figure 2 is a plan view thereof.

Referring to the drawings in detail, the machine includes a frame embodying a channel bar indicated generally by the reference character 5, which bar is bent intermediate its ends to provide the forward portion 6 of the frame.

The reference character 7 indicates the supporting axle of the machine which operates in the bearings 8 that are secured to the channel bar or frame of the machine in any well known manner.

Secured on the axle to move therewith are the wheels 9 that have inwardly disposed extensions 10 on which the gears 11 and 12 respectively are mounted.

The reference character 13 indicates the forward portion of the conveyor, while the reference character 14 indicates the rear portion thereof which is hingedly connected to the forward portion at 15. These sections of the conveyor are supported by the upwardly extended arms 16 that have their lower ends secured to the frame of the machine, the upper ends of the arms being braced by bar 17 that connect the arms at each side of the frame to hold the arms against inward movement.

Supporting arms 18 are also secured to the frame of the machine and extend upwardly and rearwardly where they connect with the frame of the conveyor section 14 as clearly shown by Figure 1.

Each of these conveyor sections includes spaced bars between which the rollers 19 are pivotally mounted and disposed in spaced relation with each other.

The conveyor embodies endless chains 20 that pass over the sprockets 21 arranged at the ends of the shafts 21' at the ends of sections 13 and 14, the chains being connected by the bars 22 that are arranged in predetermined spaced relation with each other and to which the canvas material 25' of which the conveyor is constructed, is secured.

At the forward end of the conveyor is a scoop 23 that is mounted between the side members of the frames of the sections and arranged at an angle to cause the same to scrape the surface over which the same is moving.

Mounted directly above the scoop and secured to the frame, are supporting arms 24 that have their upper ends connected by means of the shaft 25 that carries sprockets 26 thereon. Gears 27 are also carried on the shaft and are designed to mesh with the teeth of the rack bars 28 that have their lower ends pivotally connected to the side bars of the lower section 13, at 29. A guard indicated at 30 is connected with each rack bar and is designed to restrict pivotal movement of the rack bars to hold them in position at all times.

The shaft 21' of the section 13 is provided with sprockets at its outer ends, over which the chains 31 operate, which chains also pass over the sprockets 32 mounted on the shaft 33, which shaft is rotated by the sprocket 34 that receives motion from the rear axle, through the chain 35.

As illustrated by Figure 1, the gear 11 mounted on the rear axle is engaged by the gear 36, which gear 36 is mounted on a shaft carried by the arm 37 that is pivotally mounted on the frame of the machine at 38, the arm 37 having a weight 39 to counterbalance the arm and assist the operator in moving the same.

The shaft on which the gear 36 is mounted, also supports the sprocket 40, over which the chain 35 moves and which transmits movement to the chain for operating the conveyor.

Operating adjacent to the arm 37 is an arm 41 which also carries a shaft on which the gear 42 is secured, the arm 41 being pivotally supported in the same manner as the arm 37, so that the gear 41 may be moved into and out of engagement with the gear 12 for rotating the shaft on which the gear 41 is mounted, at the will of the operator.

Sprocket 43 is also mounted on the shaft that carries the gear 42 and over which sprocket the chain 44 operates, the chain 44 also operating over sprocket 26 to direct rotary movement to the shaft 25, which in turn operates the gears 27 disposed at the ends thereof for feeding the rack bars 28 upwardly or downwardly to adjust the scoop 23 so that the scoop may operate at various depths.

The arms 37 and 41 are controlled by means of the levers 45 and 46, which levers have connection with the rods 47 and 48 respectively, that in turn connect with the bell crank levers 49 and 50 that are secured to the shafts 50', which are pivotally supported by the frame of the machine and which are disposed transversely thereof.

Links 51 are shown as connecting the bell crank levers 49 to their arms that support the gears 42 and 36.

It might be further stated that while I have shown and described arms carrying gears to be thrown into and out of operation by gears carried by the rear axle of the machine, it is to be understood that this structure is duplicated at the opposite side of the machine and that bell crank levers corresponding to the bell crank levers 49 are arranged at the opposite ends of the shafts 50 for operating the arms at that side of the machine, to the end that an even and direct pull will be exerted on the shafts and main axle of the machine.

Thus it will be obvious that by moving the levers 45 and 46, the gears 36 and 42 may be thrown into and out of operation at the will of the operator and the conveyor thrown into and out of operation, or the scoop adjusted for a particular class of work.

Mounted at the rear of the machine and designed to dump rearwardly, is a body 52 which is provided with a hinged end gate 53 normally held in closed position by means of pivoted latches 54. These pivoted latches are operated by means of the rods 54' that are disposed on opposite sides of the machine and have their upper ends connected with the arms 55 that are secured to the sides of the body 52, by means of the bolts 56 which bolts pass through elongated openings 57 of the arms so that the body 52 may be adjusted on its support to cause the same to dump readily.

Mounted on the frame is a shaft 58 disposed intermediate the ends thereof, to which shaft are secured the arms 59 that extend upwardly therefrom, which arms 59 are connected with the rear rods 60 and forward rod 61, the forward rod 61 being connected with the lower end of the lever 62 at 63.

Thus it will be seen that when it is desired to dump the body 52 which has its lower upper end positioned to receive material from the endless conveyor, it is only necessary to move the lever 62 forwardly, tripping the latch member 54 and allowing the body 52 to swing to its dumping position.

In the operation of the device, the machine is moved over a ground surface to be scraped or leveled, after the scoop has been properly positioned, with the result that material such as stones, lumps or dirt or the like will be passed rearwardly over the endless conveyor, from where the material will be deposited in the body of the machine to be dumped in a predetermined place.

When it is desired to throw the machine out of operation, levers 45 and 46 are operated to cause the endless conveyor to be elevated to a position out of contact with the ground surface and the gears 36 and 42 thrown out of engagement with the gears of the rear axle.

I claim:

A road machine including a wheel supported frame, a body on the frame, a sectional conveyor frame embodying a stationary rear section and a pivoted front section, an endless conveyor operating over the sections, a pair of spaced vertical stationary supporting arms mounted on the frame, a shaft mounted at the upper ends of the supporting arms, pinions on the shaft, rack bars secured to the forward ends of the front section, a rearwardly extended elongated guard bar connected with each rack bar and extending throughout the length of the rack bars, said rack bars cooperating with the pinion to move the rack bars vertically when the pinions are rotated, and means for imparting movement of the wheels to the pinions to raise and lower the pivoted front section, and a scoop at the forward end of the front section.

In testimony that I claim the foregoing as my own, I have hereto affixed my signature.

WILLIAM HOLMES.